June 2, 1931.  A. W. ALTVATER  1,807,952
CUTTING, TRIMMING, AND ORNAMENTING MACHINE
Filed Jan. 25, 1929  8 Sheets-Sheet 1

Inventor.
Arthur W. Altvater,
by Rippey & Kingsland.
His Attorneys.

June 2, 1931.  A. W. ALTVATER  1,807,952
CUTTING, TRIMMING, AND ORNAMENTING MACHINE
Filed Jan. 25, 1929   8 Sheets-Sheet 2

June 2, 1931.　　　A. W. ALTVATER　　　1,807,952
CUTTING, TRIMMING, AND ORNAMENTING MACHINE
Filed Jan. 25, 1929　　　8 Sheets-Sheet 3

Inventor:
Arthur W. Altvater,
by Rippey & Kingsland.
His Attorneys.

June 2, 1931.                A. W. ALTVATER                 1,807,952
                CUTTING, TRIMMING, AND ORNAMENTING MACHINE
                Filed Jan. 25, 1929          8 Sheets-Sheet 5

Inventor
Arthur W. Altvater,
by Rippey & Kingsland
His Attorneys

June 2, 1931.  A. W. ALTVATER  1,807,952
CUTTING, TRIMMING, AND ORNAMENTING MACHINE
Filed Jan. 25, 1929  8 Sheets-Sheet 7

Inventor
Arthur W. Altvater,
by Rippey & Kingsland.
His Attorneys.

Patented June 2, 1931

1,807,952

UNITED STATES PATENT OFFICE

ARTHUR W. ALTVATER, OF ST. LOUIS COUNTY, MISSOURI

CUTTING, TRIMMING AND ORNAMENTING MACHINE

Application filed January 25, 1929. Serial No. 334,934.

This invention relates to cutting, trimming and ornamenting machines.

One object of the present invention is to provide an improved machine adapted for and capable of application to many useful purposes, such, for instance, as making ornamental cut-outs in shoe parts and shoe uppers, for trimming work of different kinds, such as shoe parts, shoe uppers and the like, and for otherwise ornamenting the work by producing ornamental outlines and demarcations.

Another object of the invention is to provide a machine of the character and type and for the purpose mentioned having improved devices for supporting work of different kinds and shapes for operation of the cutting, trimming and ornamenting mechanism.

Another object of the invention is to provide improved means for effectively controlling the operation of the machine in a highly efficient and satisfactory manner so as to require the machine to be operated in a definite cycle so as to avoid accidents that might result from improper operation.

Various other objects will appear from the following description, reference being made to the accompanying drawings in which.

Figures 18, 19:
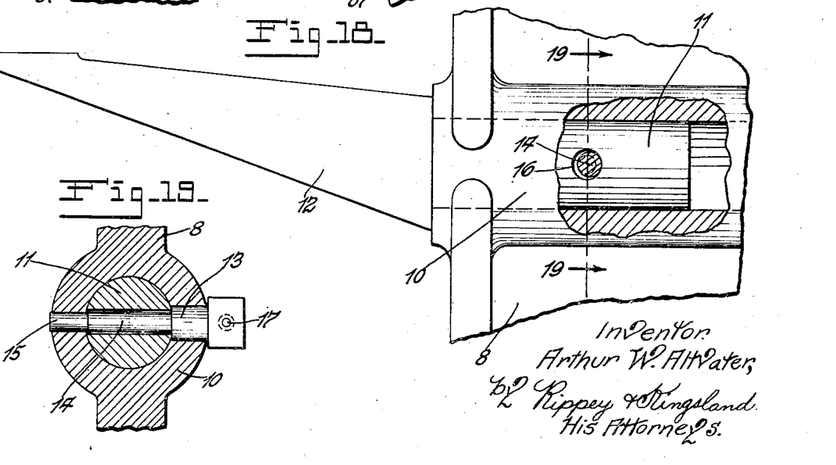
Fig. 18 is a side elevation with parts in section showing the work support or platen of Fig. 2 and the device for removably attaching the same to the frame of the machine.
Fig. 19 is a cross sectional view on the line 19—19 of Fig. 18.

The supporting frame of the machine comprises a base 1 forming an enclosure having an opening at one side and designed and adapted to contain an electric motor 2 which may be inserted and removed through the opening. An intermediate part 3 of the frame is mounted upon the upper end of the base 1 and is equipped on one side with a switch device 4 of familiar construction for controlling operation of the motor. The part 3 of the frame is hollow and to the front wall of said part 3 a bracket 5 is removably secured by bolts 6. The end of the bracket 5 is formed with a socket 7 designed and adapted to receive the arms of different types of work supports or platens. A frame for supporting the driven mechanism of the machine is rigid with the upper end of the intermediate frame part 3 and comprises a vertical portion 8 and a forwardly extended portion 9. The vertical portion 8 of the upper frame member is formed near its lower end with a socket 10 which is designed and adapted to receive the end 11 of an anvil, platen or work support 12 ( Figs. 2 and 18). A fastener for the member 12 is provided, the same comprising a pin including a part 13, an eccentric extension 14 from said part 13 and an end portion 15 at the end of the eccentric 14. The parts 13 and 15 are in axial alinement. This pin is inserted in a bearing in the socket 10 in a position in which the eccentric 14 is located wholly within a hole 16 in the part 11. The end of the part 13 is equipped with a handle 17 whereby the pin may be rotated to a position in which the eccentric 16 will lock or clamp the member 11—12 in a rigid position in connection with the frame. Or, the lock pin may be loosened and removed to permit removal of the member 11—12.

The forwardly extended portion 9 of the frame is formed with a socket 18 which is designed and adapted to receive the upper end of a rod 19 capable of being locked in position in said socket by a lock pin 20 similar to the lock pin for the member 12.

Figures 9, 10, 11:
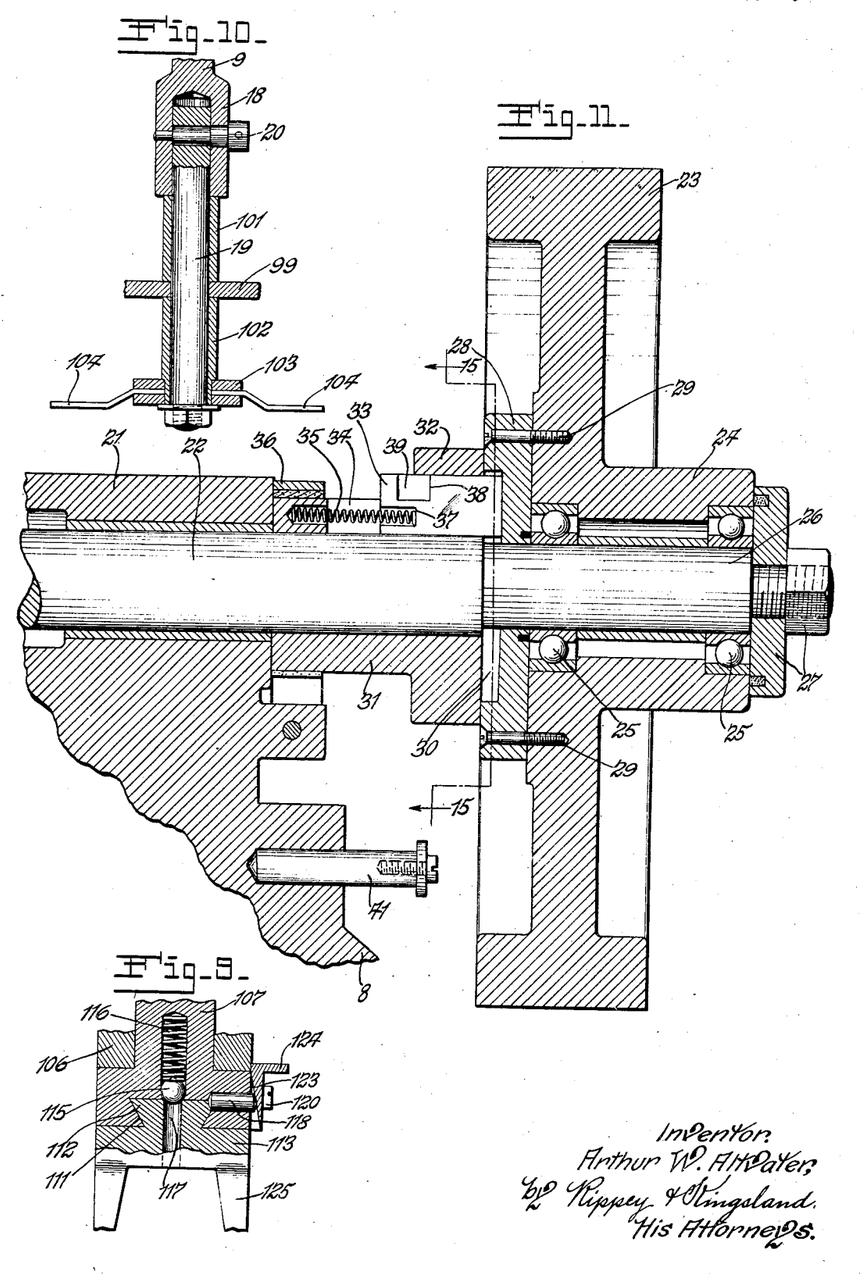
Fig. 9 is a detail sectional view showing a locking or clamping device for holding the dies in rigid position on the die holders.
Fig. 10 is a sectional view of the support for the die carrier of Figs. 1 and 2 and showing also the mounting for the die striker plate.
Fig. 11 is an enlarged sectional view showing parts of the clutch device for driving the operating mechanism.

On the upper end of the part 9 of the frame a bearing 21 is formed. A shaft 22 is journaled for rotation in the bearing 21. A pulley 23 has a hub 24 projecting from its outer side (Fig. 11). A pair of anti-friction bearings 25 are mounted in the ends of the hub 24 and these bearings 25 are mounted on the reduced outer end 26 of the shaft 22. The washer and nut device 27 removably mounted on the end of the loose portion 26 of the shaft 22 holds the pulley on the shaft.

Figure 15:
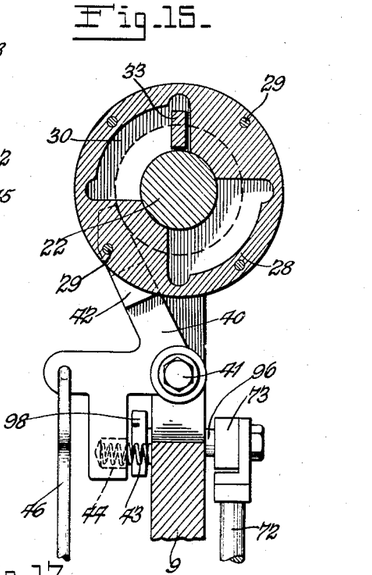
Fig. 15 is a sectional view approximately on the line 15—15 of Fig. 11 showing other features of the clutch mechanism.

A clutch member 28 is detachably secured to the inner side of the pulley 23 by screws 29. This clutch member is in the form of a plate or disc and in its inner side a pair of diametrically opposite arcuate recesses 30 are formed (Fig. 15).

A sleeve comprising a portion 31 of reduced diameter and a portion 32 of larger diameter is attached to the shaft 22. The end of the sleeve on which the part 22 is formed is adjacent to the clutch member 28. A clutch device 33 is mounted for sliding movements in a slot 34 in the part 31—32. A spring 35 has one end mounted in an appropriate spring seat 36 in the part 31 at one end of the slot 34 and the opposite end in a recess 37 in the end of the clutch device 33. This spring actuates the clutch device 33 in a direction to engage in the recesses 30. Each of the recesses 30 extends approximately one-fourth of the distance about the shaft 22. The recesses 30 are of considerably greater length than the width of the clutch device 33 in order to assure that the clutch device may enter one or the other of said recesses when the shaft 22 is stationary and the pulley 23 is rotating.

Figure 14:
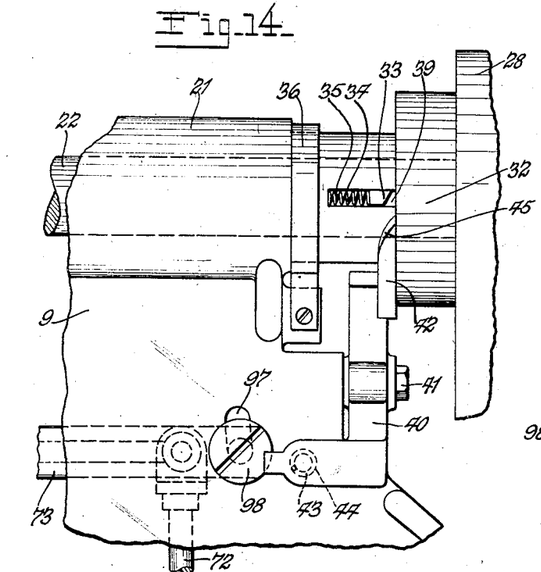
Fig. 14 is a side elevation showing parts of the driving mechanism and the control therefor.

The outer edge of the clutch device 33 is provided with a notch 38 which has a cam 39 at one end. A bell crank lever 40 is mounted on a pivot 41. A cam 42 is attached to the upper end of the lever 40. A spring 43 having one end abutting against the frame part 9 and the other end engaging in a spring seat 44 in the lower arm of the lever 40 actuates the lever 40 in a direction and to an extent to hold the cam 42 against the periphery of the surface of the sleeve part 31. The beveled end 45 (Figs. 12 and 14) of the cam 42 may be caused to enter the notch 38 and operate against the cam 39 and thereby move the clutch device 33 in a direction and to an extent to disengage said clutch device from the clutch member 28. That is to say, the cam 42 is capable of moving the clutch device 33 a distance equal to or greater than the depth of the recesses 30 so as to permit the pulley 33 to rotate freely about the shaft 22 when said shaft remains stationary.

A link 46 engages one arm of the lever 40 and has its lower end lapping the upper end of a link 47, the lower end of which engages a treadle 48. The lapping ends of the links 46 and 47 are attached together by a clamp 49. Obviously, depression of the treadle 48 will cause the link 46—47 to operate the lever 40 in a direction and to an extent to compress the spring 43 and to move the cam member 42 out of the notch 38. When this is done the spring 35 will move the clutch device 33 into engagement with the clutch member 28, forcing said clutch device 33 into one of the notches 30.

The motor 2 drives a belt 50 which passes through openings 51 in the intermediate frame member 3 and engages the pulley 23. Thus the pulley 23 is constantly rotated when the motor 2 is running, although the shaft 22 may be rotated or not as desired.

Figures 12, 13:
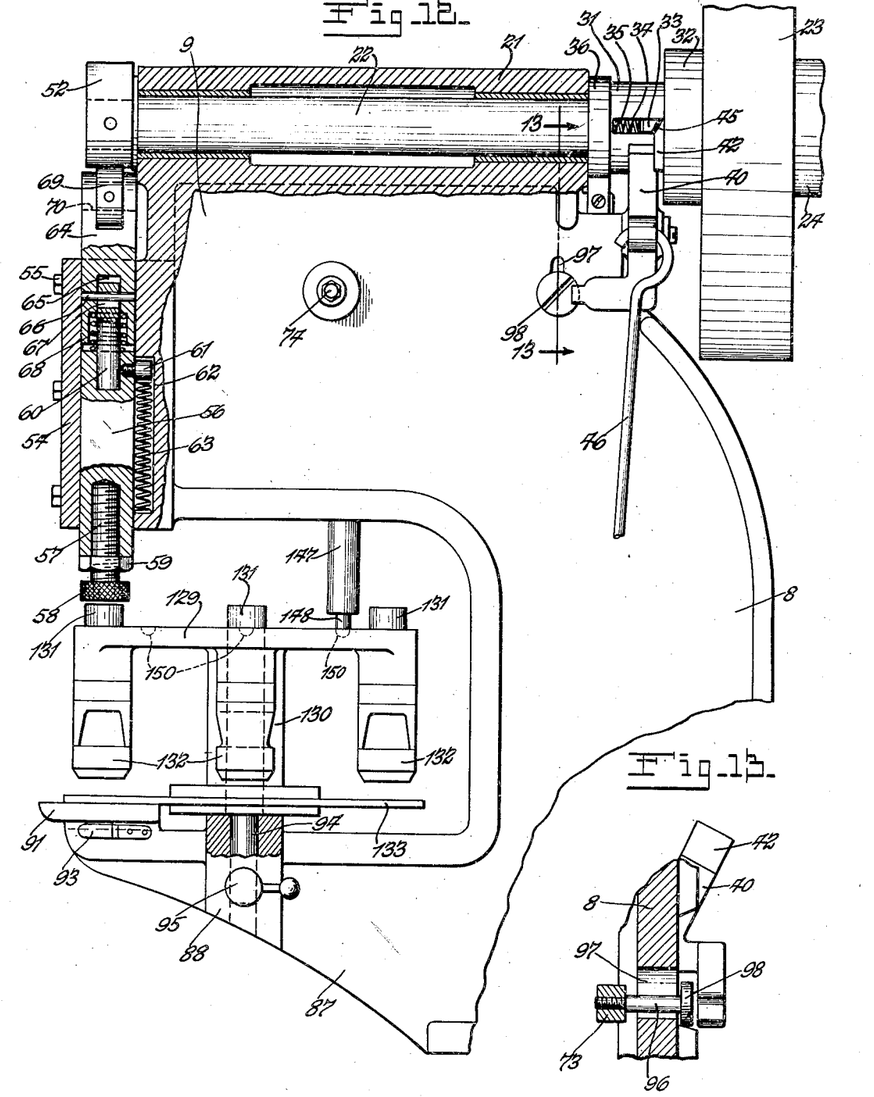
Fig. 12 is an enlarged view with parts in section showing a part of the mechanism for operating the cutting and ornamenting dies.
Fig. 13 is a detail view showing a safety device embodied in the machine to prevent improper operation.

To the opposite end of the shaft 22 from the pulley 23 an eccentric 52 is attached (Fig. 12). A pair of vertical flanges 53 are formed in spaced relationship with the front end of the forwardly extended portion 9 of the frame. A plunger of novel construction is mounted for vertical sliding movements between the flanges 53 and is held in position between said flanges and guided by a base plate 54 attached to the outer edges of the flanges 53 by removable screws 55. This plunger comprises a part 56 having an internally threaded holder in its lower end into which is screwed the threaded stem 57 of a head 58. Because of this manner of connection it is obvious that the head 58 is adjustable toward and away from the end of the part 56. A nut 59 is screwed on the stem 57 and is designed and adapted to engage the end of the part 56 so as to lock the stem 57 in connection with said part 56 and prevent said stem from working from the desired adjustment. A stem 60 projects into a hole in the upper end of the part 56 and is engaged and held in rigid engagement with the part 56 by a removable set screw 61. This set screw 61 projects into a vertical groove 62 in the wall of the part 9 between the flanges 53. A spring 63 is mounted in the groove 62 and has its lower end seated upon the lower end wall of said groove and its upper end engaging the screw 61. This spring 63 is effective to support the plunger in its raised position and to move said plunger to said position after each operation. An end member 64 for the plunger is connected with the parts described. Said end member has a hole 65 in its lower end into which the stem 60 projects. A pin 66 in the member 64 extends through a slot 67 in the stem 60 and permits longitudinal sliding movements of the part 64 with respect to the stem 60. The hole 65 is of sufficient depth to permit such sliding movements. A spring 68 is mounted within the lower end of the part 64 around the stem 60 and has its lower end seated upon the upper end of the part 56. Said spring is obviously effective to actuate the end member 64 upwardly with respect to the part 56 to the extent permitted by the pin 66 which engages against the upper end of the slot 67 and thereby limits extent of such upward movement of the part 64. The arrangement and relationship of the parts is such that when the part 64 is pushed downwardly the spring 68 may be compressed to permit the lower end of the part 64 to abut against the upper end of the part 56. The upper end of the part 64 supports a roller 69 on an axial pin 70 parallel with the axis of the shaft 22. It must now be apparent that when the shaft 22 is rotated the eccentric 52 is also rotated against the roller 69 effectively to depress the plunger in opposition to the power of the spring 63. And if the head 58 is seated upon a part to be operated thereby the spring 68 may be compressed until the lower end of the part 64 abuts against the upper end of the part 56; whereupon the part 56 will be positively moved.

A treadle lever 71 is pivoted to the lower portion of the base 1 and is connected by a link 72 (Fig. 1) with the rear end of a lever 73. The lever 73 is supported on a pivot 74 in connection with the forward extension 9 of the upper frame member and on its forward end has a fork 75 receiving the outer end of a pin 76. The inner end of the pin 76 is screwed into a hole in the plunger member 56 (Fig. 20) and projects through a vertical slot 77 in the flange 53 that is toward the lever 73. From this it is apparent that depression of the forward end of the treadle 71 will depress the plunger to engage the plunged head 58 with the part to be operated by the plunger preparatory for operation of the treadle 58 which controls rotation of the shaft 22 by the driving mechanism.

This movement of the plunger by manual operation of the lever 73 may be utilized to press the die onto or close to the work, so that the work can be placed in proper position under the die preparatory for the subsequent operation of the die by the power mechanism. Thus, the die may be located to serve as a gage to guide the operator in locating the work preparatory for final operation of the die. This operation also serves a purpose of safety; because, so long as the die is pressed against the work by the lever 73, it is impossible for the fingers of the operator to be passed under the die.

Figures 1, 2, 3, 4:
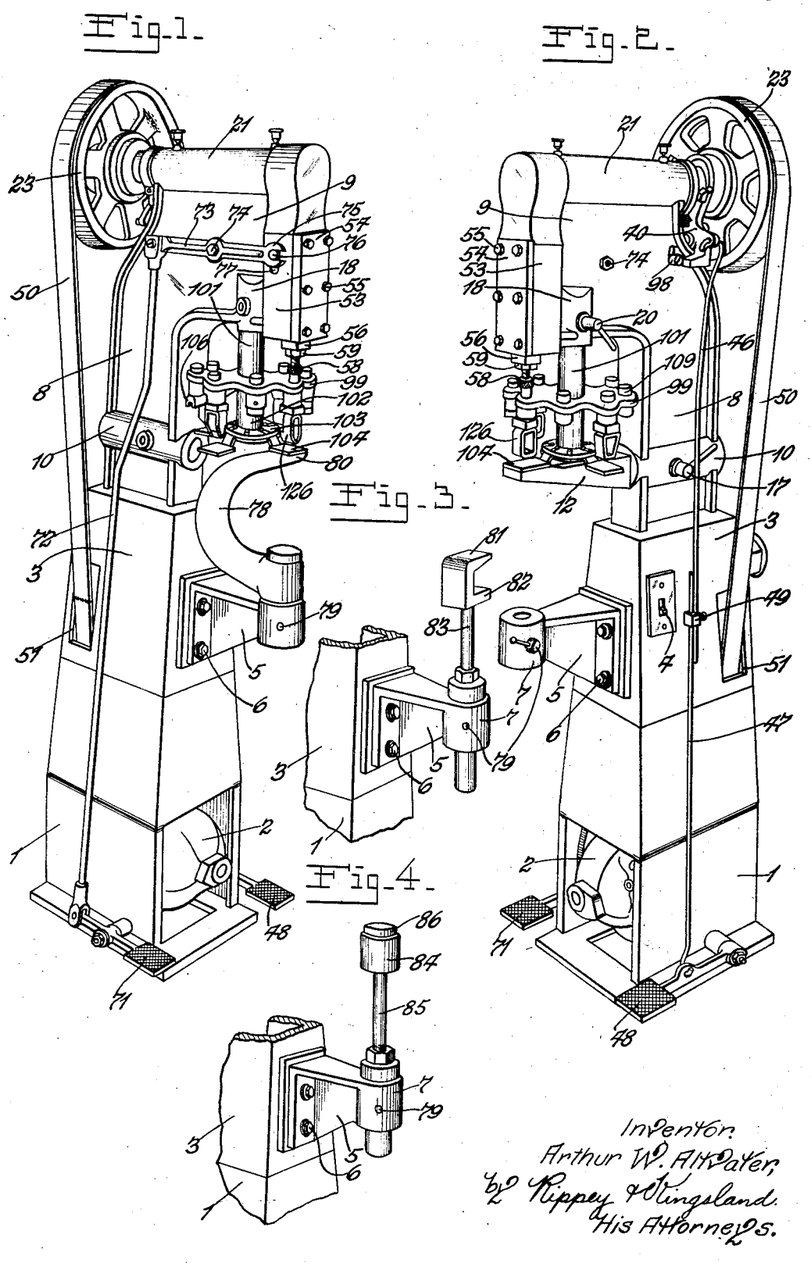
Fig. 1 is a perspective view of my improved machine equipped for operation upon certain classes of work.
Fig. 2 is another perspective view of the machine from a different position equipped with another type of work support.
Fig. 3 is a perspective view of a type of work support different from the work supports shown in Figs. 1 and 2.
Fig. 4 is a perspective view of another type of work support.
Figures 22, 24:
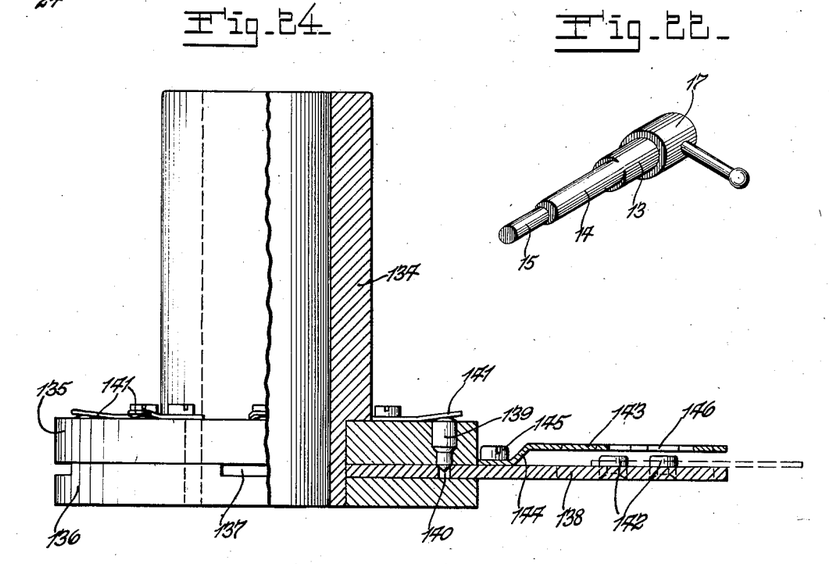
Fig. 22 is a view showing one of the eccentric lock pins used in the machine.
Fig. 24 is a sectional view on the line 24—24 of Fig. 23.

I have already indicated that this machine may be equipped with interchangeable platens or work supports and gages to support work of different kinds whether in the form of flat pieces or in the form of fitted shoe uppers or other forms of work. And I have already described the platen or work support 12 and have mentioned that the slot 7 on the bracket 5 is designed and adapted to receive different forms, shapes and designs of work supports or platens. In Fig. 1 an arcuate work support or platen 78 is removably mounted in the socket 7 and secured thereto by a lock 79 which may be similar to the lock shown in Fig. 22 used for holding the support 12. The upper end 80 of this work support or platen is in vertical alinement below the plunger which is operated by the eccentric 52. The form of work support or platen shown in Fig. 3 comprises a bifurcated member including an upper arm 81 and a lower arm 82, the latter being attached to a post 83 removably mounted in the socket 7 and locked by the lock device 79. When mounted in position the upper arm 78 is in vertical alinement with the plunger and may be turned to any direction as required for the work. The work support or platen shown in Fig. 4 comprises a head 84 attached to a stem 85 removably mounted in the socket 7 and locked by the lock device 79. The upper end of the head 84 is equipped with a bronze or other appropriate terminal 86. When this device is in position the part 86 is in vertical alinement with and below the plunger that is operated by the eccentric 52, as previously described herein.

Figure 16:
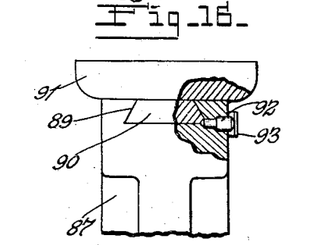
Fig. 16 is a front elevation partly in section of the type of work support or platen shown in Fig. 12.
Figure 17:
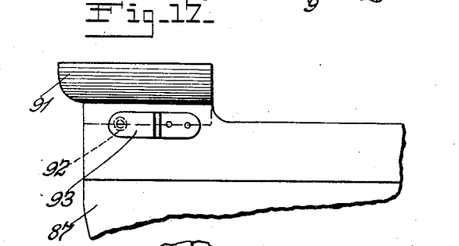
Fig. 17 is a side elevation thereof.

A variation from the foregoing interchangeable work supports is shown in Fig. 12 wherein the upper frame member 8 has an integral forwardly extending arm 87 proivded with a socket 88. As shown (Figs. 16 and 17) the upper side of the forward end of the arm 87 is formed with a front-to-rear dovetail groove 89 designed and adapted to receive a similarly shaped flange 90 on a bronze or other appropriate work support 91. Such work supports may be made of varying shapes and widths as required to receive and accommodate different classes of work. Moreover, these interchangeable parts 91 may be moved to different adjustments along the arm 87. One edge of the flange 90 is formed along its length with various numerous spaced indentations designed and arranged to receive the inner end of the latch pin 92 mounted for sliding movements in a hole in the side of the arm 87 and pressed inwardly to latching engagement with the flange 90 by a spring 93. Thus the device 91 may be forcibly moved along the arm 87 to any desired adjustment, the latch 92 escaping along the series of indentations until the part 91 is properly positioned. The latch 92, then being engaged in one of the indentations, is effective to prevent accidental movement and displacement of the selected part 91 that is being used. The socket 88 supports the lower end of an axial member 94 which is locked therein by a locking device 95 similar to the locking device described in connection with the part 12. This locking device 95 is removable to permit removal and replacement of the axial device 94.

Operation of the lever 40 to permit the spring 35 to move the clutch device 33 into clutching engagement with the clutch member 28 is controlled by the lever 73. The rear end of said lever 73 supports a pin 96 which projects through a slot 97 in the frame member 8 and has a head 98 opposite the forward end of the lever 40 so that it is necessary to move said head 98 out of the way of the lever 40 before said lever 40 can be operated to disengage the cam 42 from the clutch device 33. When the rear end of the lever 73 is raised by operation of the treadle 71 the head 98 is thereby raised above and out of the way of the forward arm of the lever 40.

The machine may be equipped with various types and forms of cutting devices, dies, trimmers or ornamenting dies. In the construction shown in Figs. 1, 2 and 10 a die carrier 99 is rotatively mounted on a rod 100 supported in the socket 18 by the locking device 20. The die carrier 99 is between an upper sleeve 101 and a lower sleeve 102 on said rod 100. The lower end of the rod 100 rotatively supports a disc 103 to which are attached a number of die striker plates 104. The disc 103 may be turned about the rod 100 as an axis to locate and position any of the plates 104 over and upon selected parts 12, 78, 81, 84, etc., so as to receive and support the work preparatory for operation of the machine in order to operate the cutting or ornamenting dies supported by the die carrier 19 or otherwise as hereinafter described.

Figure 5:
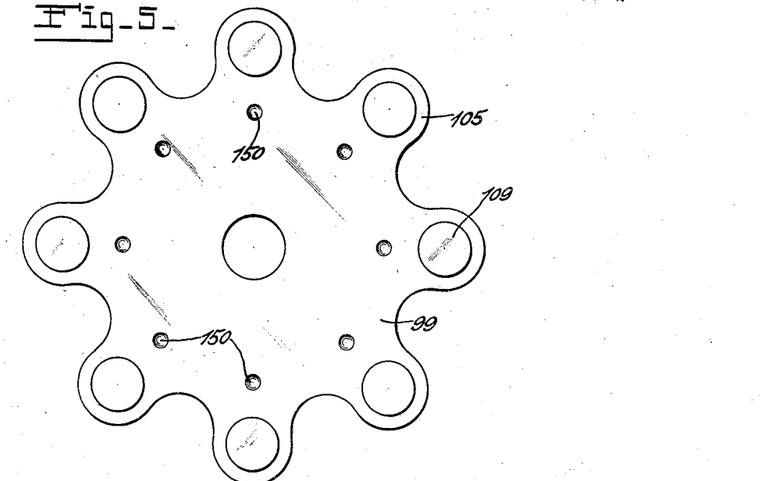
Fig. 5 is a plan view of one of the cutting or ornamenting die carriers capable of use in the machine.
Figure 6:
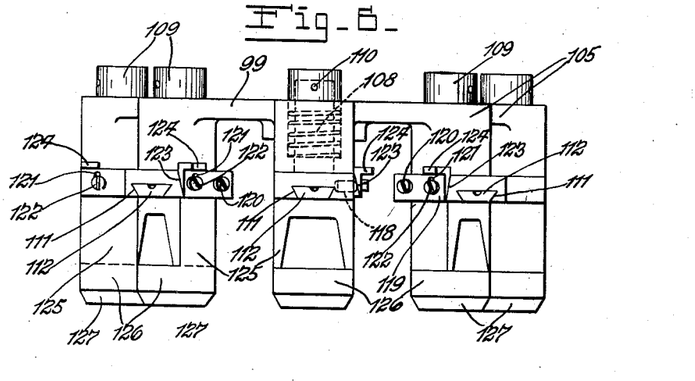
Fig. 6 is a side elevation of said cutting or ornamenting die carrier.
Figure 7:
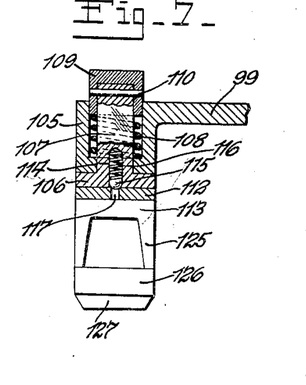
Fig. 7 is a detail sectional view showing the construction and arrangement of a holder for one of the cutting or ornamenting dies.
Figure 8:
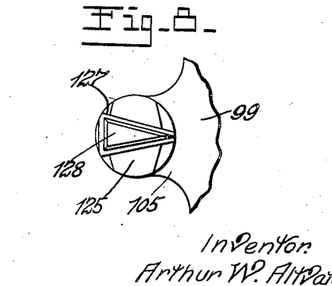
Fig. 8 is a lower end view of one of the cutting or ornamenting dies.

The die carrier 99 and the dies supported thereby are preferably in the form of a plate (Figs. 5, 6 and 7) having a circumferential series of sockets 105. In each of the sockets 105 a die holder is mounted, the same comprising a head 106 having a polygonal stem 107 projecting through a correspondingly shaped hole in the bottom wall of the socket 105 and upwardly into said socket. A spring 108 is within the socket 105 and has its lower end seated upon the bottom wall of said socket. Said spring encircles the stem 107 and has its upper end abutting against the lower end of a sleeve 109. The sleeve 109 is mounted on the upper end of the stem 107 and projects downwardly into the socket 105 and is thereby guided. Said sleeve is removably attached to the upper end of the stem 107 by a removable pin 110. It is plain enough from this description and showing that when the plunger is moved downwardly by operation of the lever 73 the plunger head 58 will be engaged against the upper end of the sleeve 109 and if such movement of the plunger by the lever is sufficient the die which is in connection with the lower end of the holder 106 will be pressed against the work.

The lower end of each die holder 106 has therein a dove-tail groove 111 receiving a correspondingly shaped flange 112 on the upper end 113 of a cutting or ornamenting die. Thus the die may be slipped into and out of connection with the die holder so as to permit removal and interchange of the dies. The lower end of the die holder 106 has therein a hole 114 in which a ball detent 115 is mounted. A spring 116 actuates the ball detent 115 downwardly to position in which a portion of the detent extends beyond the lower edge of the die holder 106. Due to the fact that the diameter of the lower end of the hole 114 is somewhat reduced by hammering or otherwise, the ball 115 cannot pass out of the hole but will extend downwardly below the lower surface of the holder 106 a distance sufficient to obtain latching engagement in a hole 117 in the upper end 113 of the die. Thus the die will be centered accurately when placed in connection with its holder so that when the die is operated it will perform its intended function in the proper manner. The die may be locked in position by a device provided for that purpose comprising a pin 118 movably mounted in a hole in the die holder 106. A combined clamp and actuator 119 is provided in connection with each die holder, the same having one end pivoted upon a support 120 and the opposite end having a slot 121 through which a screw 122 extends into the die holder 106. The inner side of the clamp 119 has a cam 123 thereon designed and adapted to operate against the end of the pin 118 to press said pin and hold said pin in clamping engagement with the die flange 112. This clamping engagement is obtained by operating the clamp and actuator 119 about its pivot 120 by means of a finger ledge 124. When it is desired to remove any die the clamp 119 is raised to loosen the pin 118 whereupon the die may readily be removed from the holder and any other die substituted.

Each die further comprises a hollow frame including two depending side members 125 having a head 126 on their lower end with a cutting or ornamenting die 127 on its under side. If the die 127 is a cutting die it is provided with an opening 128 through the head 126 communicating with the space between the side members 125 so that the cut out waste material may be discharged through the die.

It is apparent that dies of the same or different design and outline and configuration may be attached to the same die carrier and that the die carrier may be turned about its axis to position any of the dies for operation. Thus some of the dies may be cutting dies and other may be dies for producing surface ornamentations upon the work. The respective strike plates 104 may, if desired, be rotated with the die carrier 99 or independently thereof, if preferred.

Figures 20, 21:
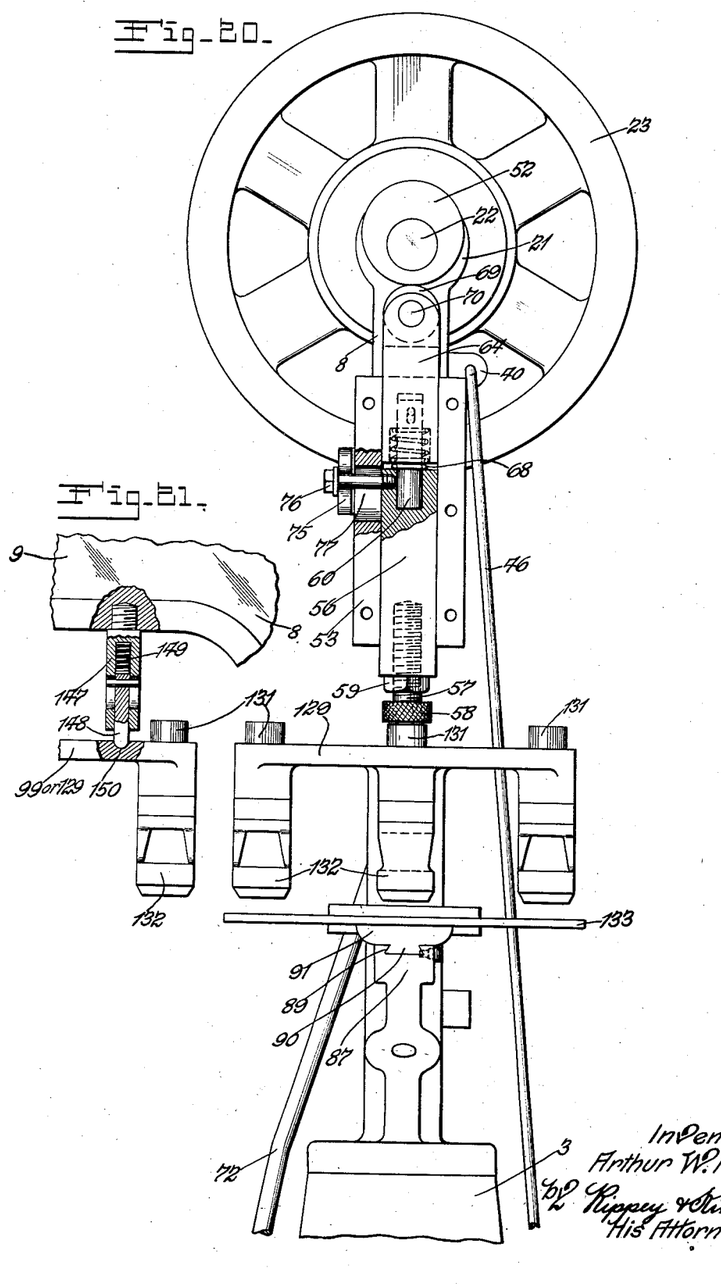
Fig. 20 is an enlarged front elevation of the mechanism shown in Fig. 12.
Fig. 21 is a detail sectional view of the latch device for centering and holding the latch carriers in proper positions for operation of selected dies.

In the variation of the invention shown in Figs. 12 and 20 a die carrier 129 is rotatively mounted upon the axial member 94, and, except for being provided with a depending hub 130, may be otherwise similar to the die carrier above described and be equipped with spring-supported depressible die holders 131 supporting detachable and interchangeable cutting or ornamenting dies 132. This die carrier 129 is rotative about the member 94 as an axis to locate any of the die holders 131 below the plunger head 58 for operation to perform the intended function of the respective dies. A die striker plate 133 is provided in connection with this die carrier 129 and may be made to rotate with the die carrier or not, as desired. As shown, the striker plate is in the form of a disc and is arranged to rest upon one of the interchangeable parts 91 so as to support the work for operation of the dies. Obviously, the striker plate 133 does not interfere to any extent with the removal and interchanging of the work supports 91.

Figure 23:
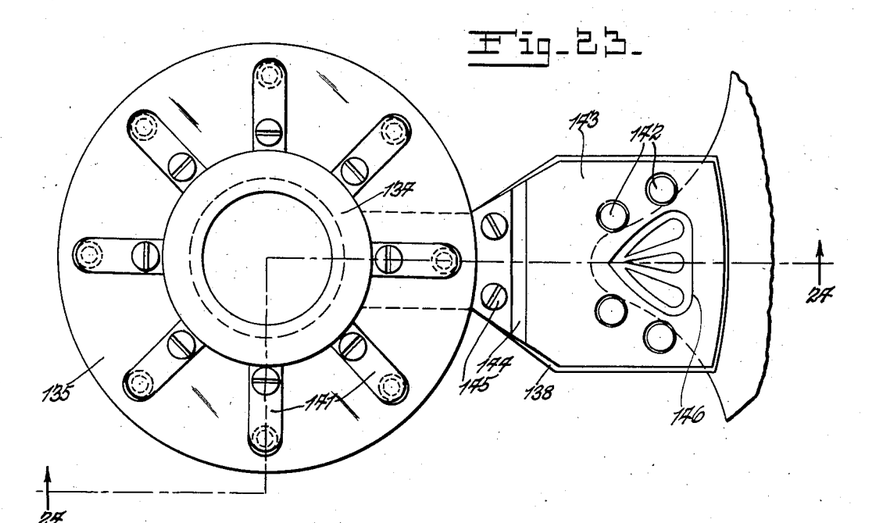
Fig. 23 is a plan view of an adjustable device for carrying supports for different types of work including gages for the work and stripper plates.
Figure 25:
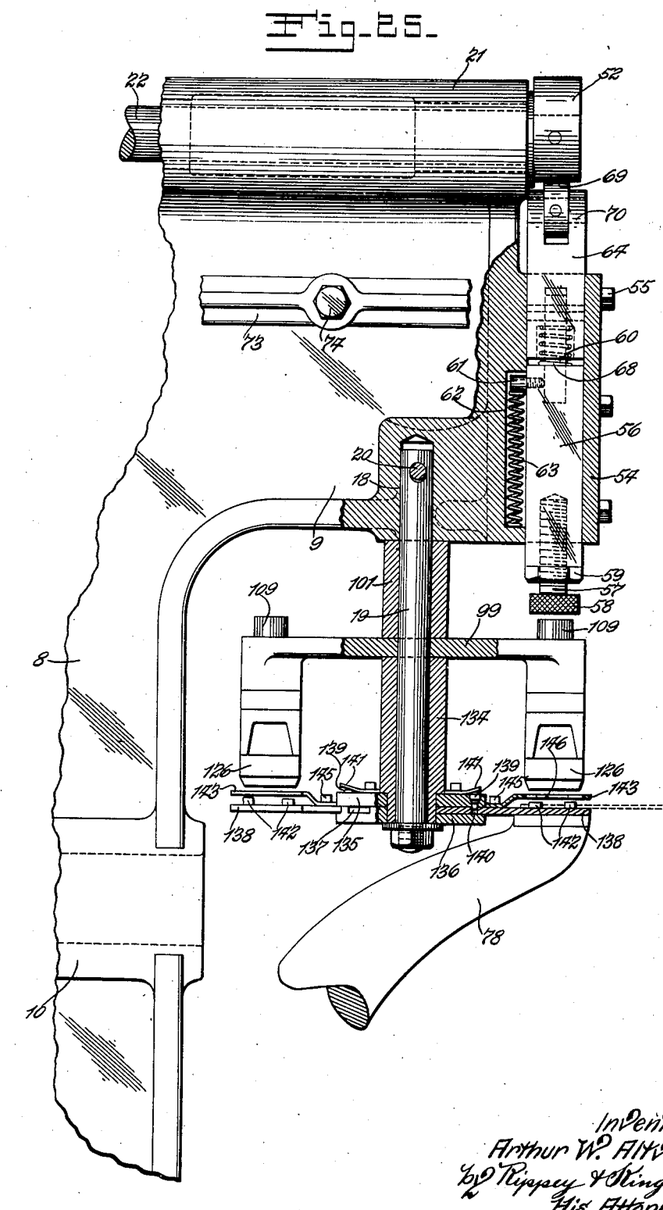
Fig. 25 is a view showing the device of Figs. 23 and 24 mounted in the machine for cooperation with the dies.

If desired, a different form of striker plate and support therefor may be used in place of the striker plate 104. As shown (Figs. 23 and 24) a sleeve 134 may be substituted for the sleeve 100. This sleeve 134 has an upper plate 135 and a lower plate 136 rigid with its lower end. The lower plate 136 is formed with a number of radial channels or grooves 137 in its upper side designed and adapted to receive the inner ends of removable and interchangeable die striker plates 138. The plate 135 supports longitudinally movable latch detents 139 which are designed and adapted to engage in holes 140 in the striker plates 138 so as to secure the striker plates in connection with the devices. Thus when the inner ends of the striker plates are inserted in the grooves or channels 137 the side edges of the striker plates engage the side walls of said grooves or channels 137 and the inner ends of the striker plates abut against the periphery of the sleeve 134 in which position the latch detents 139 engage in the holes 140. The latch detents 139 are pressed downwardly by springs 141 which permit forcible insertion and withdrawal of the striker plates 138 but will prevent accidental displacement of said striker plates. One or more of the striker plates 138 may be provided with upwardly extending flanges 142 arranged to contact with the edges of the work or material so as to insure the proper placement thereof for operation of the dies. The striker plates 138 may also support resilient stripper plates 143 having their inner ends formed with angular portions 144 seated upon and secured to the striker plates 138 by removable fasteners 145. These strippers plates are spaced above the striker plates 138 a sufficient distance to permit free insertion and withdrawal of work of different thicknesses. The stripper plates have holes 146 through which the cutting or ornamenting dies may operate to contact with the work when the machine is operated.

The rotative die carriers 99 and 129 are rotative about their axial supports 100 and 94 respectively in order to bring the different dies selectively into operation. It is desirable to prevent these die carriers from working from desired adjustments and I have shown (Fig. 21) a suitable device for this purpose. As there shown, the forward end 9 of the upper frame member of the machine carries a latch support 147 having mounted therein a movable latch 148 actuated downwardly by a spring 149 to engage successively and selectively in an annular series of cavities or holes 150 in the upper surfaces of the die carriers 99 and 129. Thus when the latch 148 is engaged in any one of the cavities or holes 150 it will prevent the die carrier from turning as a result of vibration and oscillation of the machine. However, this latch device will permit forcible turning of the die carriers to selected adjustments.

From the foregoing description the intended functions of the machine must be apparent. The machine may be optionally equipped with any suitable work support because the bracket 5 and the socket 7 provide facilities for so doing. Or, in the variation shown in Fig. 12, provision is made for use of selected types, shapes and forms of work supports 91.

Then, too, the machine shown in Figs. 1 and 2 may be equipped with die carriers 99 carrying selected shapes, forms and types of cutting or ornamenting dies and these dies may readily be interchanged on their holders 106. The various types of supports for the work are designed and adapted to receive and support various classes of work such as flat pieces of leather or other materials or fitted shoe uppers. The flat pieces of work may be laid upon the supports or upon the die striker plates 104, 138, etc., in position for operation of the dies and the side edges of the work may hang downwardly out of the way of any of the operating mechanism, whereas fitted uppers will rest upon the projecting portions of the work supports without undesirably folding or pressing the fitted uppers.

Further, when the striker plates, such as the striker plates 138 equipped with gages 142, are used, either flat pieces of work or fitted uppers may be ornamented by cutting out dies or by surface ornamenting dies. Because the gage striker plates 138 are interchangeable and removable it is plain enough that strikers having gages for different forms or shapes of work may be employed.

The latch devices 148 permit optional use of the cutting out and ornamenting dies that are mounted on any die carrier and function to hold the die carriers from accidental displacement when the machine is operating. In all of the types of dies and die carriers shown the lower ends of the dies are supported above the striker plates a sufficient distance to permit insertion of the work preparatory for operation of the machine and removal of the work after such operation.

When the machine is equipped with the selected work supports, striker plates, die carriers and dies the motor may be started by manipulation of the familiar type of switch 4. The motor may be continuously operated. The work is then placed upon the properly positioned striker plate beneath the selected die. After the work is thus positioned the treadle 71 is operated to depress the plunger head 38 against the upper end of the die sleeve 109 and, if desired, the plunger may be moved to an extent sufficient to press the die in contact with the surface of the work.

Then the treadle 48 is depressed with the result that the clutch device 33 almost immediately engages the clutch member 28 in order to obtain a clutch engagement whereby the pulley 23 which is in constant rotation will rotate the shaft 22 a single revolution. This engagement of the clutch device 23 with the clutch member 28 is made possible because, when the lever 73 is operated by the treadle 71, the head 98 of the screw 96 is moved out of the way of the end of the lever 40. Pressure is not maintained upon the treadle 48 but should be removed immediately after engagement of the clutch device 33 with the clutch member 28 if it is desired to rotate the shaft 22 a single revolution. If it is desired to rotate the shaft more than one revolution the treadle 48 is held down to permit more than one revolution of the shaft 22 by the pulley 23. Rotation of the shaft 22 rotates the eccentric 52 which forcibly operates the plunger to an extent sufficient to cause a cutting out die to cut through the work and to contact with the striker plate upon which the work is mounted; or to depress a surface ornamenting die to an extent sufficient to produce upon the surface of the work the ornamentation of the die. After operation of each die the work may be moved to another position for operation of the same or another die, or the work that had been operated upon may be removed and new work placed in the machine and the operations continued.

On April 20, 1931, I filed application Serial No. 531,449 for patent for improvements in cutting, trimming and ornamenting machines, and said application is a continuation in part of this application.

It is apparent that the construction, arrangement and relationship of the parts of my improved machine may be altered and varied within a wide range of limits without departure from the nature and principle of the invention. I do not restrict myself in any unessential respects, but what I claim and desire to secure by Letters Patent is:—

1. A machine of the character described comprising a rigid support, a series of dies, means for supporting said dies to be selectively positioned over said support and for operation toward and away from said support, a series of die striker plates corresponding respectively to said dies and being movable with said dies to position between said dies and said support, and mechanism for operating said dies toward and away from said striker plates.

2. A machine of the character described comprising a rigid support, a series of dies, means for supporting said dies to be selectively positioned over said support and for operation toward and away from said support, a series of die striker plates corresponding respectively to said dies and being movable with said dies to position between said dies and said support, a plunger for operating the dies selectively toward and away from said support, mechanism for driving said plunger in a direction to drive said dies toward said support, and means for moving said plunger in the opposite direction.

3. In a machine of the character described, the combination of a work support, a plunger, means for varying the length of said plunger, a die supported between said plunger and said support for operation by said plunger to operate upon the work mounted on said support, a rotary shaft, mechanism operated by said shaft for operating said plunger to drive the die against the work, a device for moving the plunger in a direction away from said die, and a device for moving said die away from the work.

4. In a machine of the character described, the combination of a work support adapted to be extended into a closed shoe upper, a die supported in position to permit insertion of a part of the closed shoe upper between the die and the support, a plunger for driving the die against the shoe upper on the support, a rotary shaft, means operated by said shaft for driving said plunger, a device for moving the plunger away from the die, and a device for moving the die away from the shoe upper.

5. In a machine of the character described, the combination of a rigid support, a movable support, striker plates mounted on said movable support and being optionally movable to position above said rigid support to support the work, a die, means for pressing the die upon the work on said striker plate, and means for driving the die against the work on said striker plate.

6. In a machine of the character described, the combination of a frame having a forwardly extended portion at its upper end, a rigid work support adapted to be received in a closed shoe upper and extending forwardly from beyond the front of said frame and below said forwardly extended portion of said frame and having its lateral sides wholly forward of the front of said frame, a die supported vertically above said support and wholly to the front of said frame and vertically below the forwardly extended portion of said frame, a reciprocating plunger mounted in said forwardly extended portion of said frame, mechanism for manually operating said plunger to press said die against the work on said support, mechanism for driving said plunger to drive said die to act upon the work on said support, and resilient devices for withdrawing the plunger and the die respectively from the positions to which they were operated as aforesaid.

7. A machine of the character described comprising a work support, adapted to be extended into a closed shoe upper, a die for operating upon work on the support, a lever, means for operating said lever, devices operated by said lever for pressing the die upon the shoe upper into which said support extends, power mechanism for driving said devices and thereby the die to operate upon the work on said support, and means controlled by said lever controlling operation of said driving devices by said power mechanism.

8. A machine of the character described comprising a rigid work support, a rotary die carrier, a number of dies supported by said carrier and movable thereby to position for operation toward said work support, means for moving the respective dies to positions to gage the work, and a device for driving the respective dies toward said work support.

9. A machine of the character described comprising a rigid support, a series of dies, a support for said dies, resilient means supporting said dies respectively in connection with said support, a series of striker plates corresponding respectively to the series of dies, means for holding said die support in position in which any one of said dies is above said rigid support and in which a corresponding striker plate is on said rigid support, and a driver for actuating the die that is positioned as aforesaid.

10. A machine of the character described comprising a rigid support, a series of dies, a support for said dies, resilient means supporting said dies respectively in connection with said support, a series of striker plates corresponding respectively to the series of dies, means for holding said die support in position in which any one of said dies is above said rigid support and in which a corresponding striker plate is on said rigid support, a driver for actuating the die that is positioned as aforesaid, power mechanism for positively operating said driver to drive the die against the work on said striker plate, and resilient means for withdrawing said driver.

11. In a machine of the character described, a work support, a rotary die carrier, a series of dies mounted in said carrier and being movable by the carrier to positions in which any one of said dies is in cooperative position with said support, manual means for moving toward said support the die that is in cooperative position with said support, and power means for driving the die toward said support.

12. In a machine of the character described, a work support, a rotary die carrier, a series of dies mounted in said carrier and being movable by the carrier to positions in which any one of said dies is in cooperative position with said support, manual means for moving toward said support the die that is in cooperative position with said support, power means for driving the die toward said support, and a device preventing operation of said power means until after said manual means has been operated.

13. A machine of the character described comprising a die carrier, a die holder mounted for sliding movements in said carrier, a spring enclosed by said die carrier and supporting said die holder, a die, means for detachably mounting said die in connection with said holder for operation by said holder, a plunger for operating said holder, manual means for moving said plunger toward said die holder, and power means for operating said plunger to operate the die after said manual means have been operated.

14. In a machine of the character described, a rigid work support, a die carrier mounted above said support, a die holder mounted for sliding movement in said carrier toward and away from said support, a spring enclosed by said carrier and supporting said die holder in a position away from said support, a die, detachable means for supporting said die in connection with said holder for operation thereby, a rotary shaft for operating said die holder and thereby said die toward said support, and means for effecting intermittent operations of said shaft and thereby said die holder.

15. In a machine of the character described, a work support, a die carrier, a die mounted for sliding movements in said carrier, a plunger for driving said die toward said support, a rotary shaft, mechanism operated by said shaft for operating said plunger in one direction to drive said die toward said support, means for retracting said plunger from said die, and means for retracting said die from said support.

16. In a machine of the character described, a rigid work support, a die carrier, a die, means for supporting said die in connection with said carrier for movement toward and away from said support, a spring for holding said die in position away from said support, a rotary shaft, a plunger operated by said shaft for operating said die, and power mechanism for intermittently rotating said shaft and thereby causing said plunger to operate said die toward said support.

17. In a machine of the character described, a rigid work support, a die carrier, a die, means for supporting said die in connection with said carrier for movement toward and away from said support, a spring for holding said die in position away from said support, a rotary shaft, a plunger operated by said shaft for operating said die, power mechanism for intermittently rotating said shaft and thereby causing said plunger to operate said die toward said support, and manual mechanism controlling intermittent operation of said die by said power mechanism.

18. In a machine of the character described, a rigid work support, a die carrier, a die means for supporting said die in connection with said carrier for movement toward and away from said support, a striker plate upon said supporting means arranged to support the work, gage elements in connection with said striker plate for gaging the work, and mechanism for operating the die toward and away from said support.

19. In a machine of the character described, a rigid work support, a die carrier, a die, means for supporting said die in connection with said carrier for movement toward and away from said support, a striker plate upon said supporting means arranged to support the work, gage elements in connection with said striker plate for gaging the work, power mechanism for intermittently operating said die toward and away from said support, and manual means controlling intermittent operation of said die by said power mechanism.

20. In a machine of the character described, a rigid support, a die carrier, a die, means for supporting said die in connection with said carrier for movement toward and away from said support, a striker plate mounted on said supporting means, gages in connection with said striker plate for gaging the work, a stripper plate between said striker plate and said die, and mechanism for driving said die through said stripper plate toward the work on said striker plate.

21. In a machine of the character described, a rigid support, a die carrier, a die, means for supporting said die in connection with said carrier for movement toward and away from said support, a striker plate mounted on said support, gages in connection with said striker plate for gaging the work, a stripper plate between said striker plate and said die, manual means for moving said die through said stripper plate and into contact with the work on said striker plate, and power mechanism for driving the die to perform its intended operation upon the work after movement of said die by said manual means as aforesaid.

22. In a machine of the character described, a work support, a die carrier, a die supported in connection with said carrier for movement toward and away from said work support, a rigid guide, a plunger mounted in said guide, a spring supporting said plunger, manual means for moving said plunger in a direction and to an extent to move said die toward the work on said support, and power mechanism for driving the die to perform its intended operation upon said work after operation of said manual means.

23. In a machine of the character described, a rigid work support, a die, means for supporting said die spaced from said support to permit insertion of the work on said support and withdrawal of the work therefrom, a plunger, a head in connection with said plunger for operating said die toward the work on said support, means for holding said head in different adjusted positions, and mechanism for driving said plunger in a direction to drive said die toward the work on said support.

24. In a machine of the character described, a rigid work support, a die, means for supporting said die spaced from said support to permit insertion of the work on said support and withdrawal of the work therefrom, a plunger, a head in connection with said plunger for operating said die toward the work on said support, means for holding said head in different adjusted positions, mechanism for driving said plunger in a direction to drive said die toward the work on said support, and devices for withdrawing the plunger from said die and the die from the work on said support respectively.

25. In a machine of the character described, a rigid support for the work, a die carrier, a series of dies mounted on said carrier, means for supporting said die carrier in position for operation to place any die on said carrier adjacent to said support, a series of movable striker plates mounted for selective cooperation with said support and arranged to support the work in position for operation of a selected die on the work, and mechanism for operating the selected die.

26. In a machine of the character described, a rigid support for the work, a die carrier, a series of dies mounted on said carrier, means for supporting said die carrier in position for operation to place any die on said carrier adjacent to said support, a series of movable striker plates mounted for selective cooperation with said support and arranged to support the work in position for operation of a selected die on the work, gages for the work, a stripper plate above each striker plate, and mechanism for intermittently operating the die that is in position to cooperate with said striker plate.

27. A machine of the character described comprising a rigid frame, a work support, means for supporting the work support in connection with said frame, a locking device for the work support, a striker plate seated on the work support for supporting the work, a die above the striker plate, mechanism for operating the die toward said striker plate, a power device for operating said mechanism intermittently, and means for withdrawing the die from the striker plate.

28. A machine of the character described comprising a rigid frame, a work support on said frame, a die carrier, a plurality of dies supported by said carrier for movement thereon to and from position to cooperate with said work support, means for supporting said die carrier for movement to and from position to locate said dies selectively for cooperation with said support, a latch device for holding said die carrier in its different positions, and a plunger for driving toward said work support the die that is in position for cooperation therewith.

29. A machine of the character described comprising a rigid frame, a work support on said frame, a die carrier, a plurality of dies supported by said carrier for movement thereon to and from position to cooperate with said work support, means for supporting said die carrier for movement to and from position to locate said dies selectively for cooperation with said support, a latch device for holding said die carrier in its different positions, a plunger for driving toward said work support the die that is in position for cooperation therewith, and mechanism for operating said plunger intermittently.

30. A machine of the character described, comprising a rigid upright frame, a support rigid with said frame and projecting forwardly from the front of said frame for extension into a fitted shoe upper, said frame having a forwardly extended portion above said support, a die supported between said forwardly extended portion of said frame and said work support, a horizontal shaft journalled for rotation at the upper end of said frame, means for pressing said die against a shoe upper on said support, mechanism other than said means operated by said shaft for forcing said die into the work on said support, and mechanism for rotating said shaft intermittently in the same direction from and to a starting position.

31. In a machine of the character described, a die holder having a groove in its lower end, a support for supporting and guiding said die holder, an abutment attached to the upper end of said die holder, a spring enclosed in said support and engaging said abutment for yieldingly supporting said die holder in said support, a die, a flange on said die seated in said groove in the lower end of said die holder, and a device supported by said die holder preventing said die from becoming displaced.

32. In a machine of the character described, a support, a die holder having a groove in its lower end, a stem projecting from said die holder into said support, a spring enclosed by said support and supporting said stem for sliding movements, a die, a flange on said die engaged in said groove, a device for centering the die with respect to the die holder, and means for preventing the die from becoming displaced.

33. A machine of the character described, comprising a rigid upright frame, a bracket rigid with and projecting forwardly beyond said frame, an angular work support extendible into a fitted shoe upper, means for securing said work support rigidly on said bracket, a die supported for vertical sliding movements above the upper end of said support, devices for pressing said die downwardly to position to gage the location of the work on said support, and mechanism for driving said die downwardly to ornament the work.

34. In a machine of the character described, a rigid upright frame, means for securing selected work supports to said frame, striker plates mounted for movement to a position overlying said supports, dies for operating against the work mounted on said striker plates, devices for pressing the dies against the work to gage the work, and power mechanism for driving the dies against the work to ornament the work.

35. In a machine of the character described, a rigid upright frame, means for securing selected work supports to said frame, striker plates mounted for movement to a position overlying said supports, dies for operating against the work mounted on said striker plates, devices for pressing the dies against the work to gage the work, power mechanism for driving the dies against the work to ornament the work, and means controlled by said devices preventing operation of said dies by said power mechanism until the dies have been moved to gaging position as aforesaid.

36. A machine of the character described, comprising a work support, a die, means for supporting the die for vertical reciprocating movements above the work support, devices for moving the die toward the work to gage the position of the work on the support, a rotary shaft, mechanism for intermittently rotating said shaft in one direction, members operated by said shaft for driving the die against the work to ornament the work, power mechanism for rotating said shaft, and means controlled by said devices preventing rotation of said shaft by said power mechanism until said devices have been operated to move the die to gaging position.

37. A machine of the character described, comprising a support for the work, a vertically reciprocating die, means supporting said die spaced above said support, a shaft, a plunger operative by said shaft to drive the die downwardly to operate upon the work on said support, mechanism for rotating said shaft intermittently and in one direction from and to a starting position and thereby causing said plunger to operate said die, and means for moving the die to position to gage the work before operation of said shaft.

38. A machine of the character described comprising a rigid frame, a work support rigid on said frame and adapted to be received in a closed shoe upper, a die carrier, a plurality of dies supported by said carrier for movement thereby to and from position to cooperate with said work support, means for pressing against the work on said support any die that is in position to cooperate with said support, power mechanism, and devices for causing said power mechanism to operate intermittently and alternately with the operation of said means to operate the die toward said work support after said die has been moved as aforesaid.

39. A machine of the character described comprising a rigid upright frame, a work support rigid with and projecting forwardly from said frame for extension into a fitted shoe upper, a die supported above said work support for downward movement against the work on said support, a rotary shaft supported by said frame above said die, means operated by said shaft for operating said die, a constantly operating driving mechanism, mechanism for rotating said shaft by said driving mechanism intermittently in one direction from and to a starting position, devices for pressing the die against the work, and means controlled by said devices preventing operation of said last named mechanism while said devices are in an unoperated position.

40. In a machine of the character described, a work support extendible into a fitted shoe upper, a die supported above said work support, a plunger for operating said die, manual means for operating said plunger to press the die against the work on said support, a rotary shaft for applying a power impulse to said plunger, constantly operating power mechanism, elements for rotating said shaft intermittently by said power mechanism, devices operative to cause said power mechanism to cooperate with said elements to rotate said shaft intermittently, and means preventing operation of said devices until after said manual means has been operated.

41. A machine of the character described comprising a work support, a die supported in position to operate against the work on said support, a plunger for actuating said die, mechanism for operating said plunger to press the die against the work on said support, power mechanism, a shaft for applying a power impulse to said plunger, means for rotating said shaft intermittently by said power mechanism, and devices controlled by said first named mechanism controlling operation of said means.

42. A machine of the character described comprising a work support, a die supported in position to operate against the work on said support, a rotary shaft, constantly operating power mechanism for said shaft, devices controlling intermittent rotation of said shaft by said power mechanism, a plunger mounted between said shaft and said die for driving said die into the work, manual means for operating said plunger to move the die against the work on said support, and elements controlled by said manual means preventing operation of said devices and thereby preventing rotation of said shaft until after said manual means has been operated.

43. A machine of the character described comprising a movable die, a rotary shaft supported for intermittent rotation, power mechanism for rotating said shaft, a plunger driven by said shaft for operating said die, manual means for operating said plunger to move said die, and devices controlled by said manual means controlling intermittent rotation of said shaft by said power mechanism.

44. A machine of the character described comprising a movable die, a rotary shaft supported for intermittent rotation, power mechanism for rotating said shaft, a plunger driven by said shaft for operating said die, manual means for operating said plunger to move said die, devices controlled by said manual means controlling intermittent rotation of said shaft by said power mechanism, and means for stopping rotation of said shaft in a definite starting position after each complete revolution of said shaft by said power mechanism.

45. A machine of the character described comprising a die, a plunger for operating said die, manual means for actuating said plunger, a rotary shaft for applying a power impulse to said plunger, mechanism for rotating said shaft intermittently, means for stopping rotation of said shaft after each complete rotation thereof, and means controlled by said manual means preventing rotation of said shaft while said manual means remains unoperated.

46. A machine of the character described comprising a die, a plunger for operating said die, manual means for operating said plunger to press said die against the work to be operated upon by said die, a rotary shaft for applying a power impulse to said plunger, constantly operating power mechanism, mechanism for rotating said shaft by said power mechanism, and devices controlled by said manual means for controlling intermittent rotation of said shaft by said power mechanism.

47. A machine of the character described comprising a support arranged to extend into a fitted shoe upper, a guide mounted above said support, a die supported and guided by said guide, a spring enclosed in said guide for supporting the die spaced from said support to permit placement of the shoe upper between the die and the support and to remove the die from the shoe upper after operation of the die, an additional guide above said first guide, a plunger mounted in said additional guide for pressing said die onto the shoe upper, a spring enclosed in said additional guide for supporting said plunger in its starting position, a rotary shaft, and an eccentric attached to said shaft for operating said plunger to drive the die against the shoe upper.

48. In a machine of the character described, the combination of a frame having a forwardly extended portion at its upper end, a rigid work support adapted to be received in a closed upper and extending forwardly beyond the front of said frame below said forwardly extended portion and having its lateral sides wholly forward of the front of said frame, a guide above said support, a die supported in said guide, a spring enclosed in said guide for supporting said die spaced from said support to permit placement of the shoe upper between said die and said support, an additional guide supported by said forwardly extended portion of said frame above said die, a plunger mounted in said additional guide, a spring enclosed in said additional guide for supporting said plunger in its starting position, a rotary shaft, an eccentric on said shaft, and a part in connection with the upper end of said plunger engaged and operated by said eccentric for driving said plunger downwardly against said die a distance sufficient to drive the die against the shoe upper on said support.

49. A machine of the character described comprising a rigid work support adapted to be extended into a closed shoe upper, a die movable to and from position to operate on a shoe upper on said support, manipulative mechanism for pressing the die into contact with the shoe upper into which said support extends, power mechanism for driving a part of the manipulative mechanism to drive the die to operate upon the shoe upper on the support after said die has been pressed against the shoe upper by said manipulative mechanism, means for withdrawing the die from the work after such manipulative and power mechanisms have been operated, and means for supporting said die in and out of position for operation by said manipulative and power mechanisms.

50. A machine of the character described comprising an upright frame, a work support adapted to be extended into a closed shoe upper and projecting forwardly from said frame and having its lateral sides forwardly beyond the forward side of said frame, a die, means in connection with said frame for supporting said die above said work support, a rigid guide supported by said frame, a plunger mounted in said guide for driving said die against the shoe upper on said support, means enclosed in said guide for supporting said plunger in its starting position, a rotary shaft, an eccentric attached to said shaft, an element above said plunger for driving said plunger downwardly, means for operating said element by said eccentric, and a spring supporting said element spaced from said plunger.

51. In a machine of the character described, a rigid frame, a work support projecting forwardly from said frame, a die supported by said frame above said work support, a rotary shaft extending rearwardly from the front of said frame and having its forward end above said die, mechanism operated by the forward end of said shaft for driving said die to operate upon the work on said support, mechanism at the rear end of said shaft and near the rear of said frame for rotating said shaft intermittently from and to a definite starting position, manipulative connections for moving said die into contact with the work on said support, and means preventing rotation of said shaft by said mechanism while said manipulative connections remain unoperated.

52. In a machine of the class described, a rigid frame, a work support projecting forwardly from said frame, a die supported above and in position to be operated against the work on said support, a rotary shaft extending rearwardly from the front of said frame and having its forward portion above said die, mechanism at the rear end of said shaft and near the rear of said frame for rotating said shaft intermittently from and to a definite starting position, a device for obtaining effective connection of said mechanism with said shaft whereby said mechanism will rotate said shaft, means for shifting said device to disconnect said effective connection of said mechanism with said shaft at the end of each complete revolution of said shaft, manipulative connections for moving said die into contact with the work on said support, and means preventing operation of said device to connect said mechanism with said shaft as aforesaid while said manipulative connections remain unoperated.

ARTHUR W. ALTVATER.